United States Patent
Konno et al.

(10) Patent No.: US 7,338,273 B2
(45) Date of Patent: Mar. 4, 2008

(54) CUTTER MACHINE

(75) Inventors: Masashi Konno, Takasago (JP); Nobuki Nagami, Takasago (JP); Yasuo Yoshii, Takasago (JP); Osamu Ikeda, Takasago (JP); Yoshiaki Nakata, Takasago (JP); Kazuo Iritani, Takasago (JP)

(73) Assignee: Kobe Steel, Ltd., Kobe-shi (JP)

( * ) Notice: Subject to any disclaimer, the term of this patent is extended or adjusted under 35 U.S.C. 154(b) by 123 days.

(21) Appl. No.: 10/437,063

(22) Filed: May 14, 2003

(65) Prior Publication Data
US 2003/0213352 A1 Nov. 20, 2003

(30) Foreign Application Priority Data
May 15, 2002 (JP) .............................. 2002-140765

(51) Int. Cl.
*B29B 9/00* (2006.01)
*B29C 47/08* (2006.01)
*F16D 3/26* (2006.01)
*B26D 7/26* (2006.01)

(52) U.S. Cl. .................. 425/313; 83/666; 83/698.41; 83/913; 464/112; 464/136

(58) Field of Classification Search ............... 425/196, 425/313, 316, 67; 464/110, 119, 134–136, 464/144, 145, 112, 125, 126, 905; 264/142; 83/356.3, 666, 694, 698.41, 913
See application file for complete search history.

(56) References Cited

U.S. PATENT DOCUMENTS

| 1,524,161 | A | * | 1/1925 | Weiss | .......................... 464/145 |
|---|---|---|---|---|---|
| 1,916,442 | A | | 7/1933 | Rzeppa | ........................ 464/145 |
| 2,047,660 | A | | 7/1936 | Anderson et al. | ........ 464/145 X |
| 2,182,455 | A | * | 12/1939 | Smith | .......................... 464/145 |
| 3,176,477 | A | | 4/1965 | Mazziotti | ................ 464/145 X |
| 3,196,487 | A | | 7/1965 | Snelling | ..................... 425/168 |
| 3,271,821 | A | * | 9/1966 | Street | ......................... 425/313 |
| 4,019,414 | A | * | 4/1977 | Thomas et al. | ............ 83/356.3 |
| 4,290,742 | A | * | 9/1981 | Scharer et al. | .............. 425/313 |
| 4,529,370 | A | * | 7/1985 | Holmes et al. | ............. 425/142 |
| 4,874,307 | A | * | 10/1989 | Comper et al. | ............. 425/311 |
| 5,221,233 | A | * | 6/1993 | Jacob | ......................... 464/145 |

(Continued)

FOREIGN PATENT DOCUMENTS

| CN | 1097685 A | | 1/1995 | |
|---|---|---|---|---|
| DE | 26 38 126 | | 3/1978 | |
| DE | 196 42 389 | | 4/1997 | |
| DE | 100 56 991 | | 1/2002 | |
| EP | 0 160 319 | * | 11/1985 | ................. 464/135 |
| GB | 2 135 425 | * | 8/1984 | ................. 464/134 |
| JP | 2000-301532 | | 10/2000 | |

*Primary Examiner*—Clark F. Dexter
(74) *Attorney, Agent, or Firm*—Oblon, Spivak, McClelland, Maier & Neustadt, P.C.

(57) ABSTRACT

A cutter machine has a knife holder 13 mounted onto a cutter shaft 6 at the center portion, wherein a material to be cut is cut with knives 15 mounted onto the outer circumference of the knife holder 13 by rotating the knife holder 13 around the cutter shaft 6. The knife holder 13 is separated into a fixing member 17 mounted onto the cutter shaft 6 and a mounting member 18 onto which the knives 15 are mounted. The mounting member 18 is pivotally supported around two axes with respect to the fixing member 17. In the cutter machine, the knives and a die plate come into contact with each other by a small press force of the knives, thereby enabling a satisfactory cutting to be obtained.

5 Claims, 12 Drawing Sheets

U.S. PATENT DOCUMENTS

| | | | |
|---|---|---|---|
| 5,358,399 A | 10/1994 | Ogoshi et al. | 425/311 |
| 5,525,052 A | 6/1996 | Czarnetzki et al. | 425/183 |
| 5,624,688 A | 4/1997 | Adams et al. | 425/67 |
| 5,665,402 A | 9/1997 | Czarnetzki et al. | 425/183 |
| 5,685,777 A * | 11/1997 | Schwarzler | 464/145 |
| 6,120,382 A * | 9/2000 | Sone et al. | 464/145 |

* cited by examiner

CUTTER MACHINE

BACKGROUND OF THE INVENTION

1. Field of the Invention

The present invention relates to a cutter machine, which is used in a pelletizer or the like.

2. Description of the Related Art

FIG. 10 shows the structure of a conventional pelletizer for plastic material. In order to obtain a satisfactory pellet by cutting molten plastic material extruded from a die plate 101, the cutting surface 104 of knives 103 and a resin-discharge surface 102 in the die plate have to be always maintained parallel to each other during the operation of the pelletizer. Consequently, it is necessary to precisely adjust the perpendicularity between the cutter shaft 106 onto which a knife holder 105 (onto which the knives 103 are mounted) is mounted and the resin-discharge surface 102 in the die plate prior to the operation.

However, in the pelletizer shown in FIG. 10, the connection between the knife holder 105 and the cutter shaft 106 is fixed. As a result, a deviation in the pre-adjusted perpendicularity between the cutter shaft 106 and the resin-discharge surface 102 in the die plate due to a small thermal stress and others in various portions of the pelletizer causes the parallelism between the cutting surface 104 of the knives 103 and the resin-discharge surface 102 in the die plate to be deviated and thereby to provide an incomplete cutting.

In conventional knife holders shown in FIGS. 11 and 12, it is intended that the parallelism between the resin-discharge surface 102 in the die plate and the cutting surface 104 of the knives 103 is always maintained by the resilience of a gum bush 110 or a metal plate 111, which are disposed inside the knife holder 105, even if the perpendicularity is deviated during the operation.

In this case, the knives 103 are rotated by a drive apparatus 109 in the state in which the knives are always pressed against the resin-discharge surface 102 in the die plate via the cutter shaft 106 by means of a press apparatus (not shown). When the parallelism between the cutter shaft 106 and the resin-discharge surface 102 in the die plate is deviated, a space takes place in part of the circumferential contact area between the knife 103 and the resin-discharge surface 102 in the die plate. Since, however, the knives 103 are pressed against the resin-discharge surface via the cutter shaft 106 and the knife holder 105, a deformation either in the gum bush 110 or in the metal plate 111 disposed inside the knife holder 105 causes the knives 103 to be pressed against the resin-discharge surface 102 in the die plate and therefore to be in contact therewith over the entire circumferential contact areas, thereby enabling a satisfactory cutting to be obtained.

In the conventional knife holder, a spring action effect obtainable either from the gum bush in FIG. 11 or from the metal plate in FIG. 12 is used. Accordingly, if the press force is small, such a spring element is not deformed and therefore the knives 103 come into no contact with the resin-discharge surface over the entire circumferential contact areas, thereby occasionally causing the incomplete cutting to be provided. On the contrary, if the press force is increased to securely come into contact therewith over the entire contact area, the press force is greatly increased at areas at which knives and resin-discharge surface is in contact with each other in the initial state, so that the resin-discharge surface 102 in the die plate may be injured. This causes the abrasion of the knives 103 to be accelerated, and further the bending of the knives 103 due to the bending force applied thereto forces the root of the knives to come into contact with the die plate 101, so that a space occurs between the knives and the die plate at the end part of the knives. This also provides an incomplete cutting, a break in the knives and the other troubles.

SUMMARY OF THE INVENTION

In view of the above-mentioned problems, it is an object of the present invention to provide a cutter machine, which is capable of ensuring knives to completely become in contact with a die plate even with a small press force, using neither a gum bush nor a metal plate for the resilient action.

The object is attained by the following technical means:

In a first aspect of the present invention, a cutter machine comprises a cutter shaft, a knife holder mounted onto the cutter shaft at the center portion of the knife holder, a knife for cutting a material to be cut, the knife being mounted onto the outer circumference of the knife holder and a driving apparatus for rotating the cutter shaft. The material is cut with the knife by rotating the knife holder around the cutter shaft. The knife holder is separated into a fixing member mounted onto the cutter shaft and a mounting member onto which the knife is mounted. The cutter machine is characterized in that the mounting member is pivotally supported around at least two axes with respect to the fixing member.

In a second aspect of the present invention, a rocking ring is interposed between the fixing member and the mounting member, and the rocking ring is pivotally supported around a first axis with respect to the fixing member, and the mounting member is pivotally supported around a second axis approximately perpendicular to said first axis with respect to the rocking ring.

In a third aspect of the present invention, a first fitting convex surface is disposed on the outer circumference of the fixing member and a first fitting concave surface is disposed on the inner surface of the rocking ring, in which case the first fitting convex surface in said fixing member and the first fitting concave surface in the rocking ring are slidably engaged with each other in such a manner that the rocking ring can be rocked relative to the fixing member. In addition, a second fitting convex surface is disposed on the outer circumference of the rocking ring and a second fitting concave surface is disposed on the inner circumference of the mounting member, in which case the second fitting convex surface of said rocking ring and the second fitting concave surface in the mounting member are slidably engaged with each other in such a manner that the rocking ring can be rocked with respect to the fixing member.

In a fourth aspect of the present invention, a first support pin in the direction of the first axis and a second support pin in the direction of the second axis are provided. The rocking ring is pivotally supported around the first support pin with respect to the fixing member, and the mounting member is pivotally supported around the second support pin with respect to the rocking ring.

In a fifth aspect of the present invention, the first support pin is supported inside both the fixing member and the rocking ring and the second support pin is supported inside both the rocking ring and the mounting member.

In a sixth aspect of the present invention, the first support pin is fixed to one of the fixing member and the rocking ring, and a first fitting concave depression for rotatably supporting the first support pin around the first axis is disposed on the other of the fixing member and the rocking ring. In addition, the second support pin is fixed to one of the rocking ring and the mounting member, and a second fitting concave depression for rotatably supporting the second support pin around the second axis is disposed on the other of said rocking ring and the mounting member.

In a seventh aspect of the present invention, rolling elements are interposed between the fixing member and the mounting member, by providing a space in the circumferential direction, in such a manner that the mounting member is pivotally supported with respect to the fixing member.

In accordance with the present invention, the ring and the cutter shaft in the knife holder and/or the ring and the knives in the knife holder are slid with respect to each other at a spherical surface, when a partial spacing occurs on a circumference in the case of pressing the knives against the die plate, so that the knives come into contact with the die plate over the entire area, thereby enabling a satisfactory cutting to be obtained.

Since, moreover, no resilient action resulting from a spring, such as a gum bush, metal plate or the like is used, the surface pressure between the knives and the die plate in contact therewith is always maintained to be constant. Hence, a biased abrasion of the die plate due to a strong press force, incomplete cutting resulting from an accelerated abrasion and/or bending of the knives, the breakage of knives and the like can be excluded.

Further objects, features and advantages of the present invention will become apparent from the following description of the preferred embodiments with reference to the accompanying drawings.

DESCRIPTION OF THE PREFERRED EMBODIMENTS

Referring now to the accompanying drawings, preferred embodiments of the present invention will be described.

Figure 3:
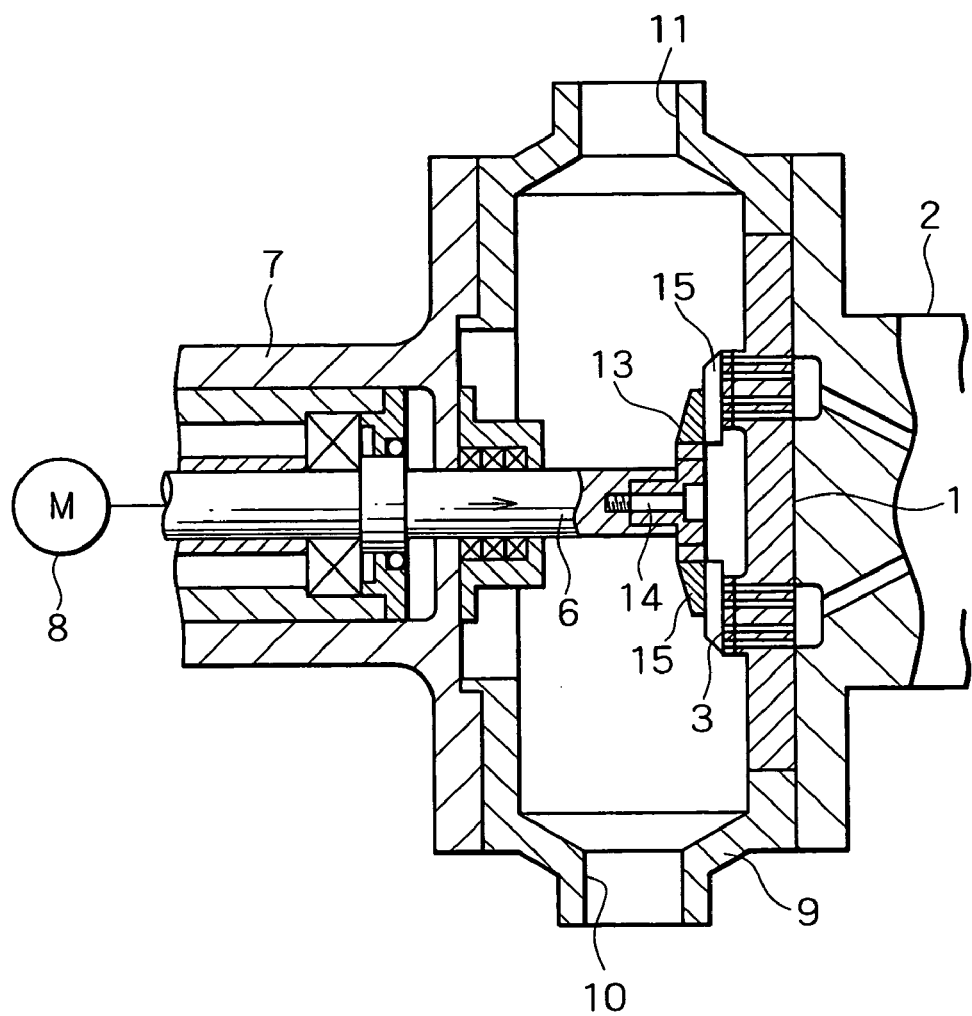
FIG. 3 is a longitudinal sectional view showing the structure of a pelletizer, which is equipped with a cutting machine of the first embodiment.

FIG. 3 shows the structure of a pelletizer, to which the present invention is applied. In FIG. 3, reference numerals 1, 2 and 3 imply a die plate, a die holder and the resin-discharge surface in the die plate 1, respectively.

Reference numeral 6 implies a cutter shaft which is rotatably supported around the axis of a cylindrical holder 7, and the cutter shaft 6 is rotated around its own axis by a driving apparatus 8, such as a motor or the like. Reference numeral 9 is a water compartment having a water inlet 10 and a water outlet 11, and the compartment is constituted such that it may be filled with water.

Reference numeral 13 implies a knife holder, the center portion of which is fixed to the cutter shaft 6 with an anchor element 14. A plurality of knives 15 is fixed to the outer circumference of the knife holder 13 in such a way that they are projected from the outer circumference. When the cutter shaft 6 is rotated by the driving apparatus 8, the knife holder 13 is rotated, together with the cutter shaft 6, around the axis of the cutter shaft 6, and the knives are pressed against the resin-discharge surface 3 via the cutter shaft 6, so that the resin in the die plate is cut by the knives.

Figure 1:
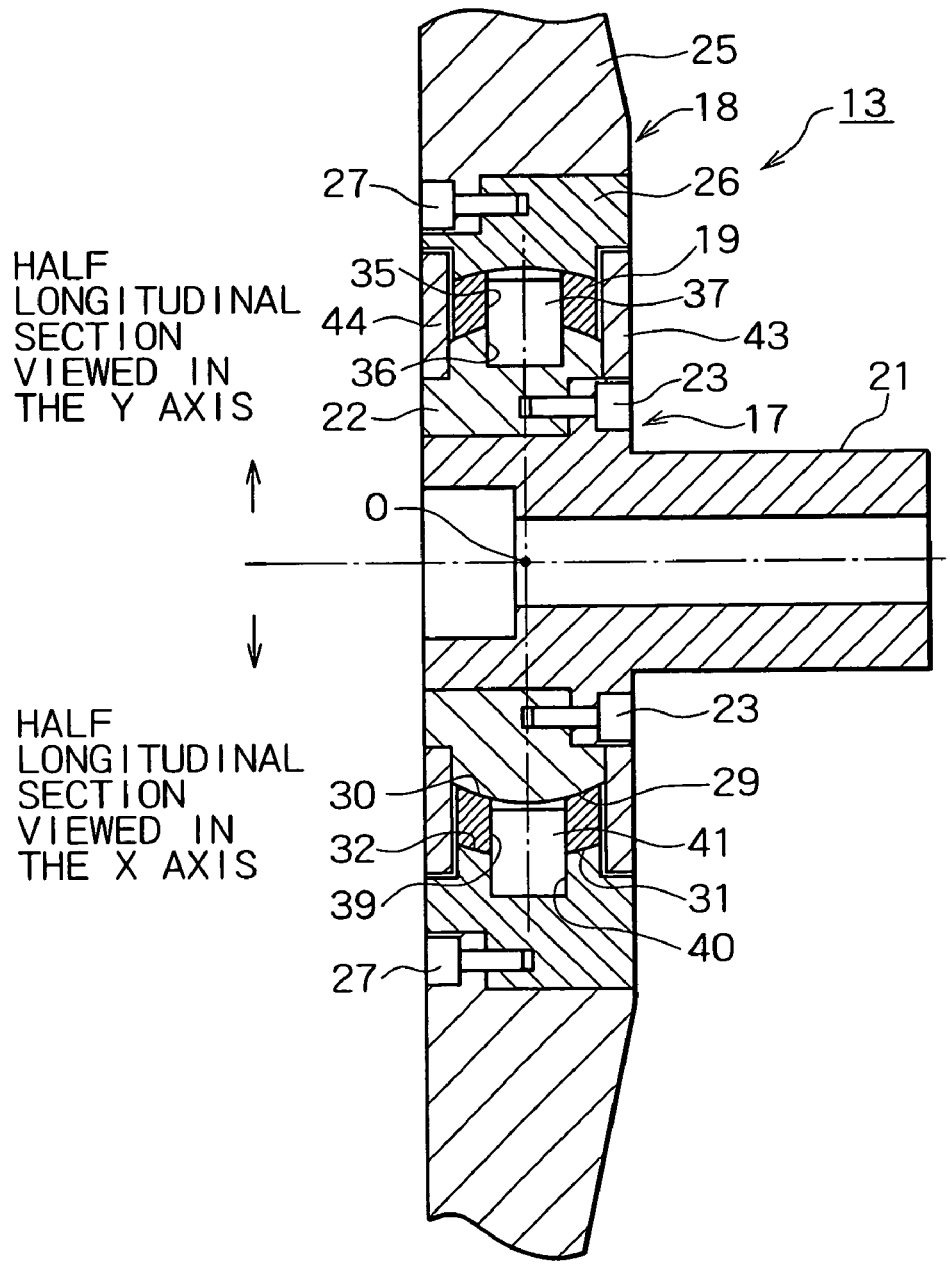
FIG. 1 shows longitudinal sections of a first embodiment according to the invention viewed in the Y axis and X axis directions.
Figure 2:
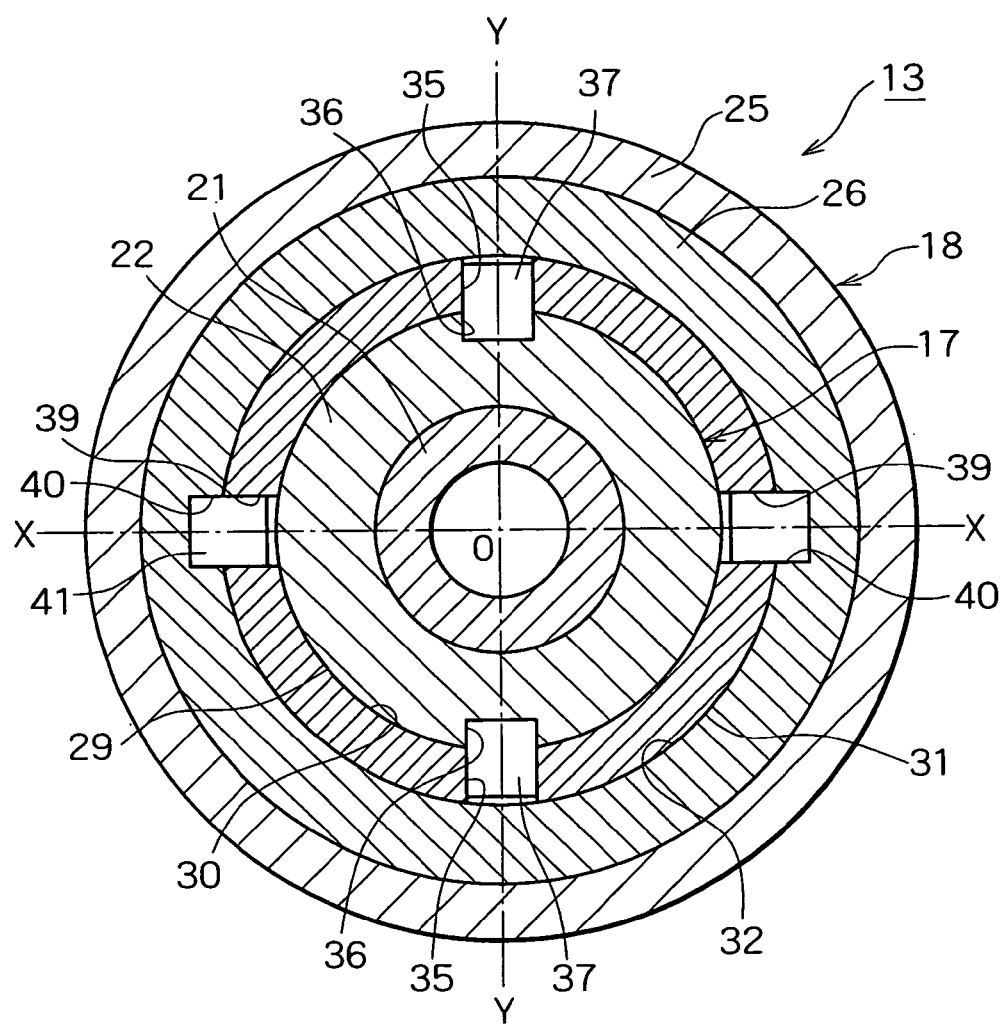
FIG. 2 is a cross section of the same viewed from the rear side.

In FIGS. 1 and 2, the knife holder 13 can be divided into a fixing member 17 coupled to the cutter shaft 6 and a mounting member 18 to which the knives 15 are mounted, and a rocking ring 19 is interposed between the fixing member 17 and the mounting member 18.

The fixing member 17 includes a cylinder-shaped fixing cylindrical element 21 and a cylinder-shaped inner hub element 22. The fixing cylindrical element 21 is fastened to the cutter shaft 6 by means of the above-mentioned anchor element 14 inserted into the fixing cylindrical element 21. The inner hub element 22 is mounted on the outside of the fixing cylindrical element 21 and fastened to the fixing cylindrical element 21 by means of anchor elements 23, such as bolts or the like.

The mounting member 18 includes an annular mounting element 25 and a cylinder-shaped outer hub element 26. The knives 15 are coupled to the mounting element 25, spaced in the circumferential direction. The outer hub element 26 is inserted into the mounting element 25 and fastened to the mounting element 25 by means of anchor elements 27, such as bolts or the like.

The fixing member 17 is equipped with a first fitting convex surface 29 on the outer circumference of the inner hub element 22. A first fitting concave surface 30 is disposed on the inner circumference of the rocking ring 19 in accordance with the first fitting convex surface 29, and a second fitting convex surface 31 is disposed on the outer circumference of the rocking ring 19. A second fitting concave surface 32 corresponding to the second fitting convex surface 31 is disposed on the inner circumference of the outer hub element 26 in the mounting member 18. The first fitting convex surface 29, the first fitting concave surface 30, the second convex surface 31 and the second fitting concave surface 32 are formed on a spherical surface having the origin as a cross point O of the Y axis (first axis) and the X axis (second axis).

The first convex surface 29 in the fixing member 17 and the first fitting concave surface 30 in the rocking ring 19 are slidably fitted to each other, so that the rocking ring 19 is pivotally supported around the cross point O with respect to the fixing member 17. The second fitting convex surface 31 in the rocking ring 19 and the second fitting concave surface 32 in the mounting member 18 are slidably fitted to each other, so that the mounting member 18 is pivotally supported around the cross point O with respect to the rocking ring 19.

In the rocking ring 19, paired upper and lower first fitting holes 35 are formed respectively as an upper through hole and a lower through hole in the Y direction. Paired upper and lower first fitting depressions 36 corresponding to the first fitting holds 35 are formed in the inner hub element 22 of the fixing member 17. Paired upper and lower first support pins 37 aligned in the Y direction are fitted respectively into each of the first fitting holes 35 and each of the corresponding first fitting depressions 36, so that the paired upper and lower first support pins 37 are supported between the fixing members 17 and the rocking ring 19 by the insertion of these pins thereinto, thereby enabling the rocking ring 19 to be pivotally supported around the first support pins 37 (the Y axis, the first axis) with respect to the fixing member 17.

In the rocking ring 19, paired left and right second fitting holes 39 are formed respectively as a left through hole and a right through hole in the X direction. Paired left and right second fitting depressions 40 corresponding to the second fitting holes 39 are formed in the outer hub element 26 of the mounting member 18. Paired left and right second support pins 41 aligned in the X direction are fitted respectively into each of the second fitting holes 39 and each of the second fitting depressions 40, so that the paired left and right second support pins 41 are supported between the rocking ring 19 and the mounting member 18 by the insertion of these pins thereinto, thereby enabling the mounting member 18 to be pivotally supported around the second support pins 41 (the X axis, the second axis) with respect to the rocking ring 19.

Annular cover element 43 and 44 are disposed respectively on the front and rear sides of the rocking ring 19. In this case, the cover elements 43 and 44 are removably fixed to the inner hub element 22 in the fixing member 17 by means of anchor elements (not shown), such as bolts or the like. A space having a spacing of 0.1 to 0.2 mm is provided respectively between the cover element 43, 44 and the end surfaces of the rocking ring 19 and between the cover element 43, 44 and the end surfaces of the outer hub element 26 in the mounting member 18 in order to suppress an excessive rotation of the mounting member 18 and/or the rocking ring 19 as well as to obtain a movement of these elements 18 and 19, when a space takes place between the knives 15 and the die plate 1 in the case of cutting (the actual spacing in the operation substantially ranges from $3/100$ to $5/100$ mm).

In the above-mentioned embodiment, a rotation of the cutter shaft 6 by the driving apparatus 8 causes the knife holder 13 to be rotated around the axis of the cutter shaft 6 together with the cutter shaft, so that the resin in the die plate is cut by the knives 15 which are pressed against the resin discharging surface 3 via the cutter shaft 6.

In this case, the rocking ring 19 is pivotally supported around the Y axis (the first axis) with respect to the fixing member 17, whereas the mounting member 18 is pivotally supported around the X axis (the second axis) with respect to the rocking ring 19. Accordingly, the mounting member 18 is capable of being pivotally moved around the Y axis (the first axis) as well as around the X axis (the second axis). When, therefore, a partial space takes place between the knives 15 and the die plate 1 during the operation of the pelletizer, the rocking ring 19 and/or the mounting member 18 in the knife holder 13 is oscillated around the X axis or the Y axis or around a composite axis consisting of the X and Y axes, since the knives 15 are always pressed against the die plate 1 via the knife holder 13 and the cutter shaft 6. Hence, all of the knives 15 are aligned parallel to the die plate 1 without any spacing therebetween, thereby enabling a satisfactory cutting to be attained.

In this structural arrangement, no spring force is generated even when the mounting member 18 of the knife holder 13 is oscillated, so that the pressure applied to the planes of all knives 15 along the die plate 1 is constant, thereby enabling a satisfactory cutting to be obtained. Moreover, neither the resin-discharging surface 3 of the die plate 1 is injured nor the abrasion of the knives 15 are accelerated.

Figure 11:
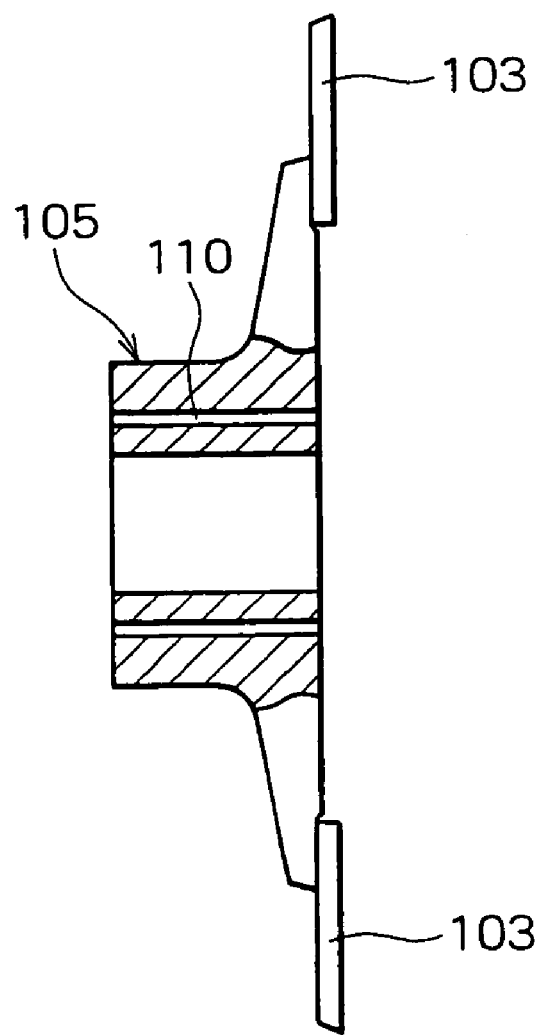
FIG. 11 is a longitudinal sectional view of a knife holder in the first prior art.
Figure 12:
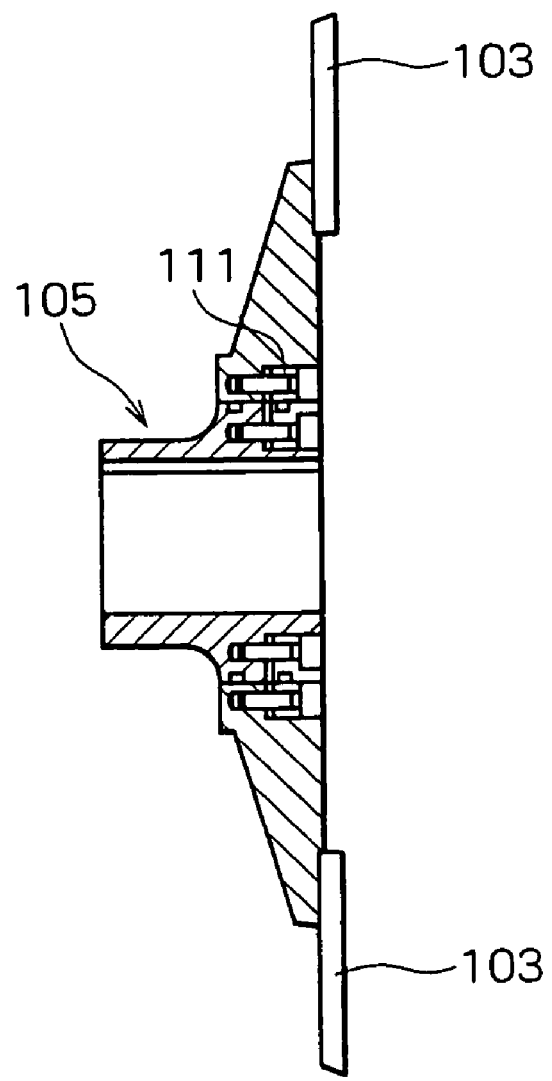
FIG. 12 is a longitudinal sectional view of another knife holder in the second prior art.

When a conventional gum bush type cutter machine, as shown in FIG. 11, is used in an underwater cutting pelletizer, a knife holder is rotated in a hot water at 50-70° C. Accordingly, there is a possibility that the gum bush is deteriorated due to such a high temperature. In the structural arrangement according to the invention, however, no thermal deterioration occurs, since the components used therein are made of metal.

Although a certain sliding resistance is assumed in the sliding of the fitting convex surfaces 29, 31 relative to the fitting concave surfaces 30, 32, such a sliding resistance can be practically reduced by increasing the spacing between the slide surfaces and/or by using rocking ring 19 made of a metal having a low abrasion coefficient and/or by coating a fluoro-resin onto the slide surfaces.

Figure 4:
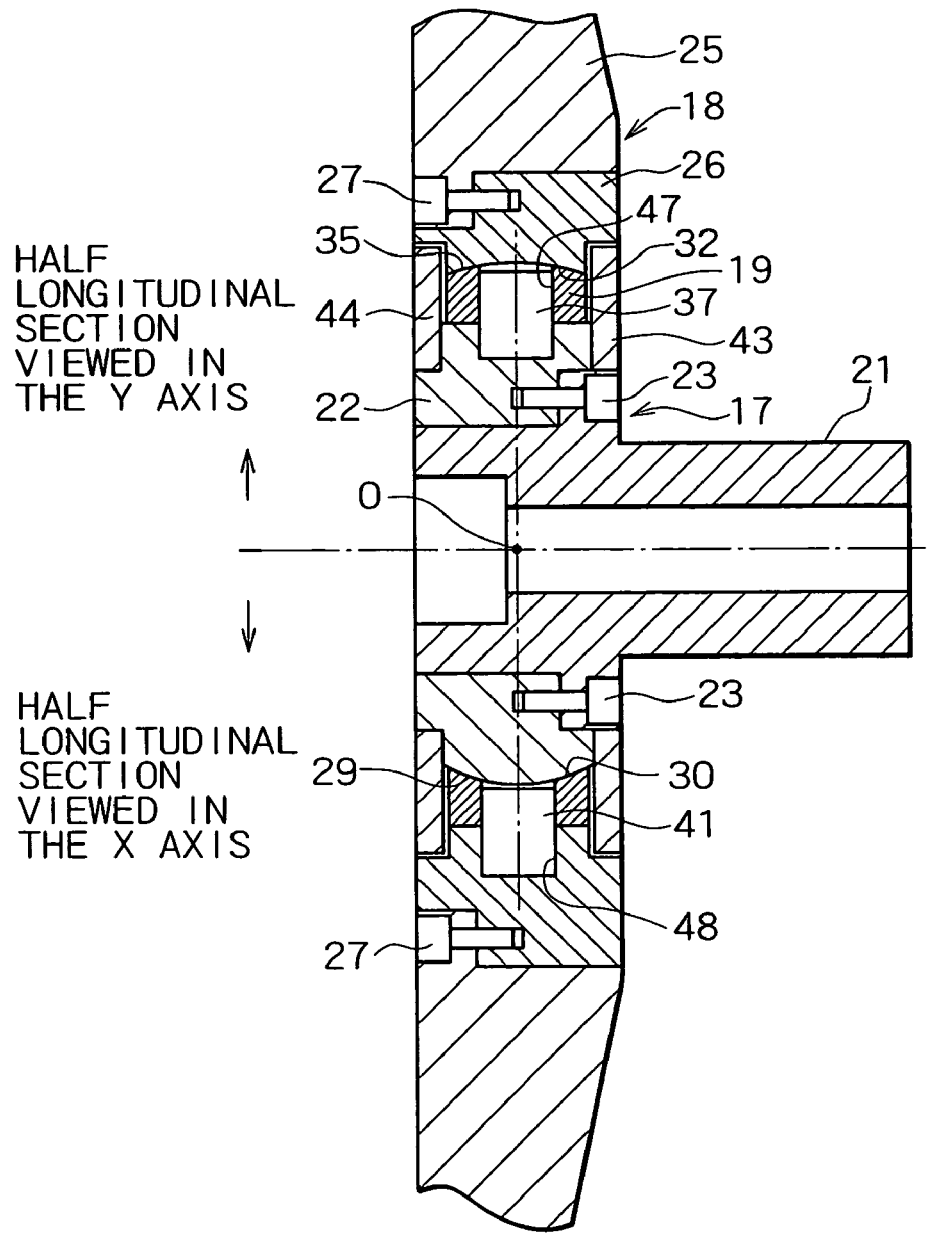
FIG. 4 shows longitudinal sections of a second embodiment according to the invention viewed in the Y axis and X axis directions.
Figure 5:
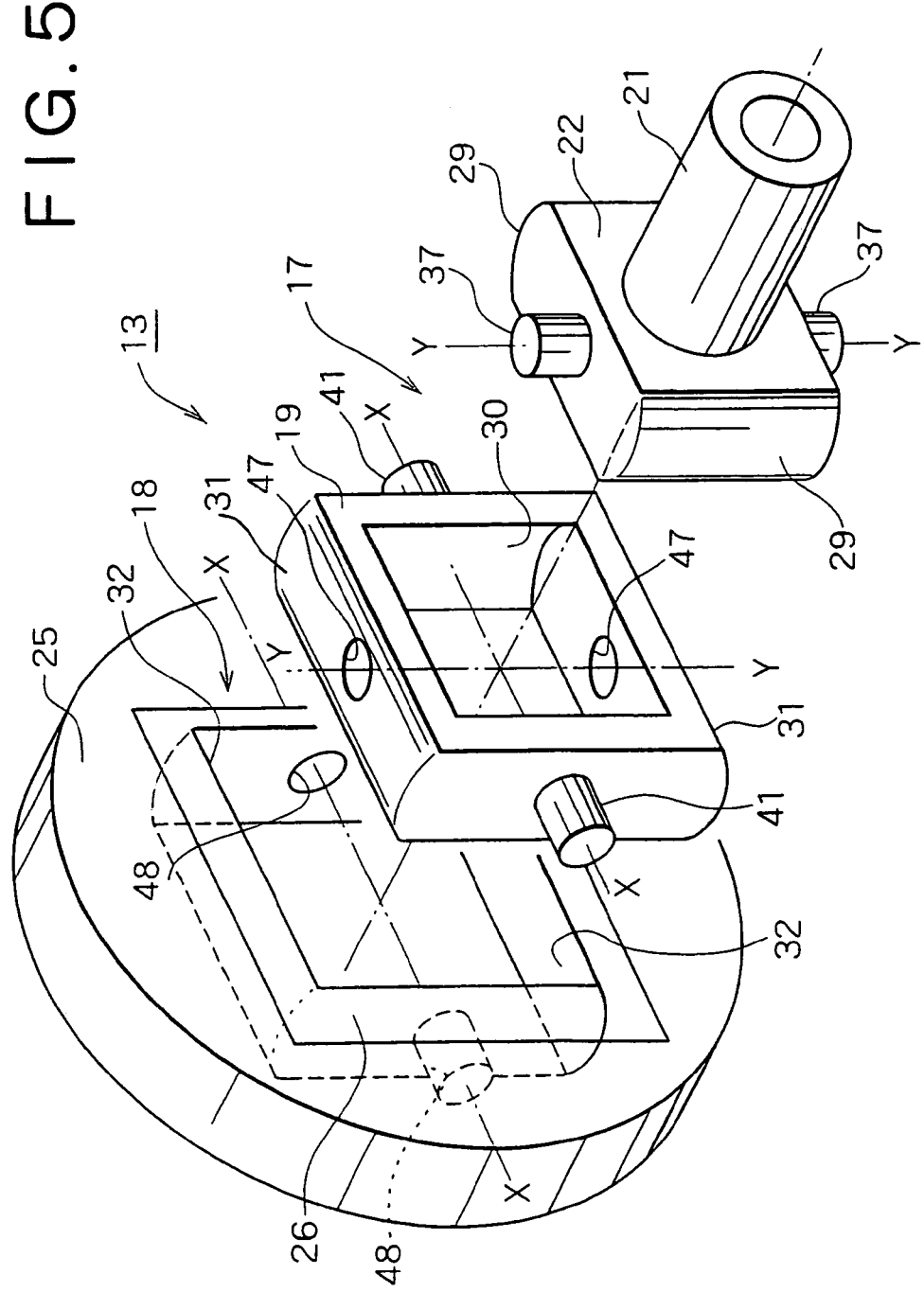
FIG. 5 is an exploded perspective view of the same.

FIGS. 4 and 5 show another embodiment of a cutter machine, in which a rectangular ring-shaped rocking ring (guide block) 19 is interposed between a fixing member 17 and a mounting member 18. An inner hub element 22 in the fixing member 17 is constituted in the form of a square plate corresponding to the shape of the rocking ring 19, and an outer hub element 26 in the mounting member 18 is constituted in the form of a rectangular ring corresponding to the shape of the rocking ring 19.

First fitting convex surfaces 29 are provided on the left and right sides in the outer circumference of the inner hub element 22, and first fitting concave surfaces 30 corresponding to the first fitting convex surfaces 29 are provided on the left and right sides in the inner circumference of the rocking ring 19. The first fitting convex surfaces 29 and the first fitting concave surfaces 30 are constituted in the form of a partial cylindrical surface having a center axis in the Y direction, and the first fitting convex surfaces 29 in the fixing member 17 and the first fitting concave surfaces 30 in the rocking ring 19 are slidably coupled to each other, so that the rocking ring 19 is pivotally supported around a support line in the Y axis with respect to the fixing member 17.

Second fitting convex surfaces 31 are provided on the upper and lower sides in the outer circumference of the rocking ring 19, and second fitting concave surfaces 32 corresponding to the second fitting convex surfaces 31 are provided on the upper and lower sides in the inner circumference of the outer hub element 26. The second fitting convex surfaces 31 and the second fitting concave surfaces 32 are constituted in the form of a partial cylindrical surface having a center axis in the X direction, and the second fitting convex surfaces 31 in the rocking ring 19 and the second fitting concave surfaces 32 in the mounting member 18 are slidably coupled to each other, so that the mounting member 18 is pivotally supported around a support line in the X axis direction with respect to the rocking ring 19.

Paired upper and lower first support pins 37 are formed such that they are projected from the inner hub element 22 in the Y axis direction. Paired upper and lower first fitting holes 47 rotatably coupled to the first support pins 37 around the Y axis (the first axis) are disposed in the rocking ring 19 so that the rocking ring 19 is pivotally supported around the first support pins 37 (the Y axis, the first axis) with respect to the fixing member 17.

Paired left and right second support pins 41 are formed such that they are projected from the rocking ring 19. Paired left and right second fitting holes 48 rotatably coupled to the second support pins 41 around the X axis (the second axis)

are disposed in the outer hub element 26 in the mounting member 18, so that the mounting member 18 is pivotally supported around the second support pins 41 (the X axis, the second axis) with respect to the rocking ring 19.

The other parts are the same as those in the first embodiment. As is similar to the first embodiment, all of the knives 15 have no spacing along the die plate 1, even if a deviation partially generates in the spacing between the knives 15 and the die plate 1, thereby enabling a satisfactory cutting to be obtained. Hence, neither the resin-discharging surface 3 in the die plate 1 is injured nor the abrasion of the knives 15 is accelerated.

In addition, the first fitting convex surfaces 29, the first fitting concave surfaces 30, the second fitting convex surfaces 31 and the second fitting concave surfaces 32 are all machined as a cylindrical surface for a sliding surface. This allows a high precision to be realized with ease in the machining.

In the second embodiment, the first support pins 37 are fixed to the fixing member 17, and the first fitting concave depressions 47 for rotatably supporting the first supporting pins 37 around the first axis are disposed in the rocking ring 19, whereas the second supporting pins 41 are disposed in the rocking ring 19, and the second fitting depressions 48 for rotatably supporting the second support pins 41 around the second axis are disposed in the mounting member 18. Alternatively, an arrangement can also be selected such that the first support pins 37 in the Y axis direction is fixed to the rocking ring 19, and the first fitting depressions 36 for rotatably supporting the first support pins 37 around the first axis are disposed in the fixing member 17, whereas the second support pins 41 in the X axis direction is fixed to the mounting member 18, and the second fitting depressions 40 for rotatably supporting the second supporting pins 41 around the second axis are disposed in the rocking ring 19.

Either in the first embodiment shown in FIGS. 1 to 3 or in the second embodiment shown in FIGS. 4 and 5, the fixing member 17 includes the fixing cylinder element 21 and the inner hub element 22 as separate elements and the inner hub element 22 is fastened to the fixing cylinder element 21 by means of the anchor element 23. Alternatively, the fixing member 17 can be formed such that the fixing cylinder element 21 and the inner hub element 22 are unified into an element.

Either in the first embodiment shown in FIGS. 1 to 3 or in the second embodiment shown in FIGS. 4 and 5, the mounting member 18 includes the mounting element 25 and the outer hub element 26 as separate elements and the outer hub element 26 is fastened to the mounting element 25 by means of the anchor element 27. Alternatively, the mounting member 18 can be formed such that the mounting element 25 and the outer hub element 26 are unified into an element.

Figure 6:
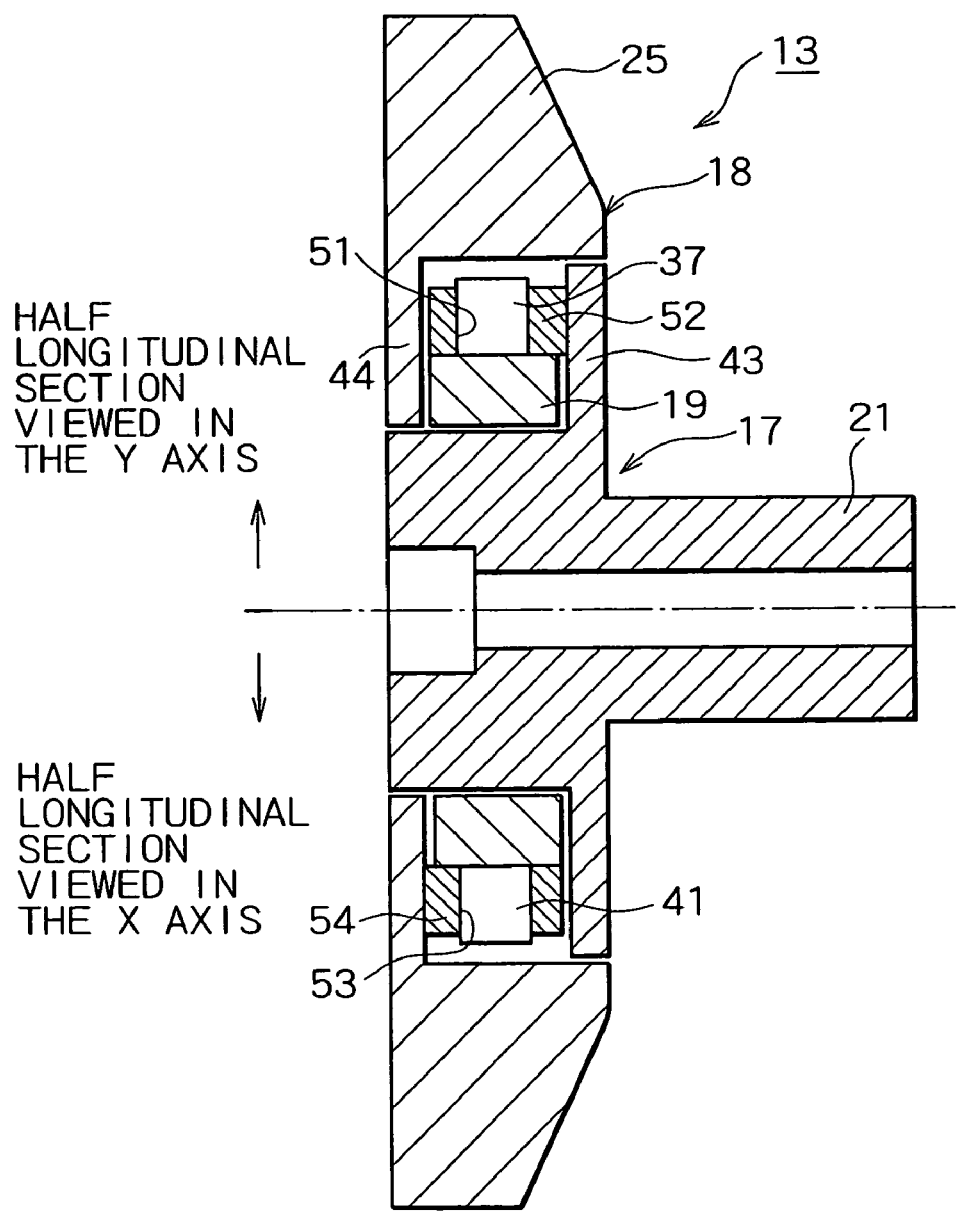
FIG. 6 shows longitudinal sections of a third embodiment according to the invention in the Y axis and X axis directions.
Figure 7:
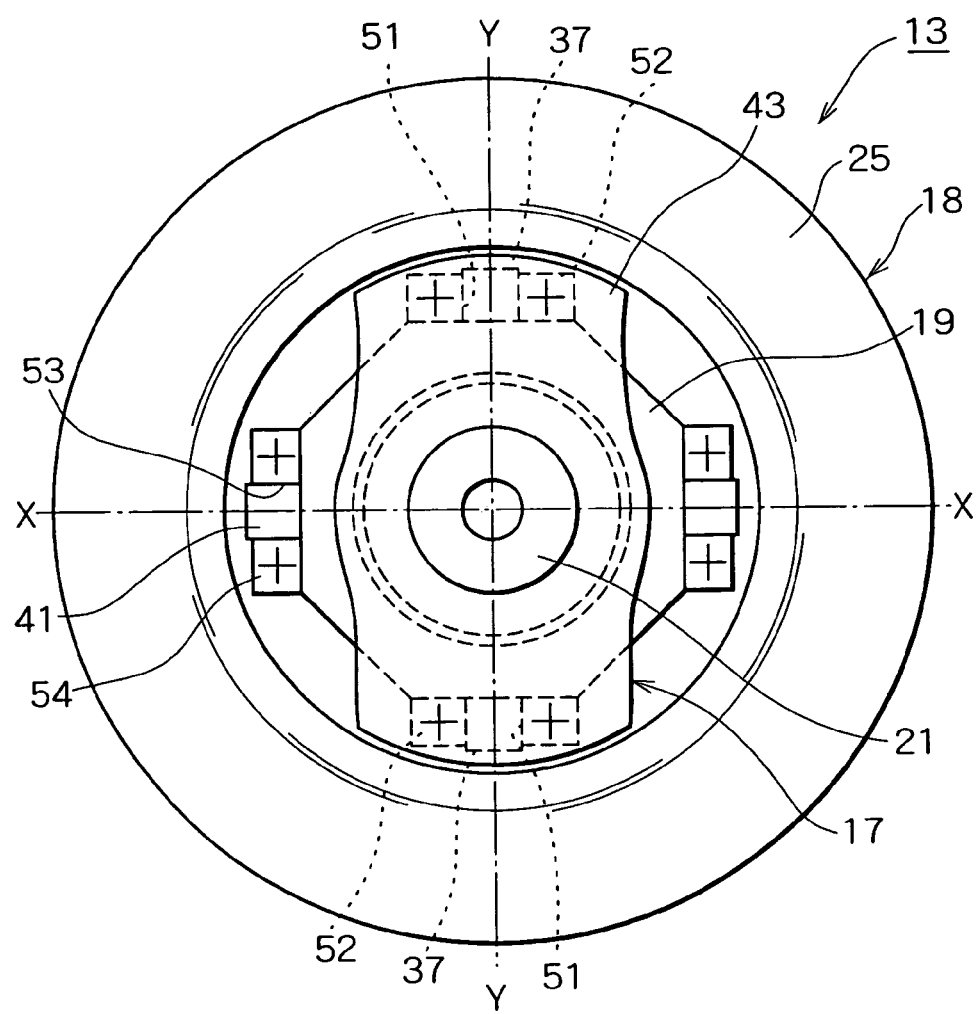
FIG. 7 is a cross section of the same viewed from the rear side.

FIGS. 6 and 7 show another embodiment of a cutter machine, in which a fixing member 17 in a knife holder 13 is constituted by a fixing cylinder element 21 having an unified cover element 43 and a mounting member 18 in the knife holder 13 is constituted by a mounting element 25 having an unified cover element 44, and further a rocking ring (cross pin guide) 19 is interposed between the fixing cylinder element 21 and the mounting element 25, in which case, the rocking ring 19 is formed such that it has a circular inner circumference and an octagon-shaped outer circumference.

Paired upper and lower first support pins 37 are disposed respectively on the upper and lower sides of the outer circumference in the rocking ring 19 such that they are projected in the Y axis direction from the outer circumference, and paired left and right second support pins 41 are disposed respectively on the left and right sides of the outer circumference in the rocking ring 19 such that they are projected in the X axis direction from the outer circumference.

Paired upper and lower first pin-receiving elements 52 each having a first fitting hole 51 in the Y axis direction are disposed respectively at the upper and lower parts of the rocking ring 19 between the fixing cylinder element 21 and the mounting element 25, and each of the first pin-receiving elements 52 is fastened to the cover element 43 in the fixing member 17 by means of anchor elements, such as bolts or the like. The paired upper and lower first support pins 37 are coupled respectively to the paired upper and lower first pin-receiving elements 52 via the corresponding first fitting holes 51, so that the rocking ring 19 is pivotally supported around the first support pins 37 (the Y axis, the first axis) with respect to the fixing member 17.

Paired left and right second pin-receiving elements 54 each having a second fitting hole 53 in the X axis direction are disposed respectively at the left and right parts of the rocking ring 19 between the fixing cylinder element 21 and the mounting element 25, and each of the second pin-receiving elements 54 is fastened to the cover element 44 in the mounting member 18 by means of anchor elements, such as bolts or the like. The paired left and right second support pins 41 are coupled to the paired left and right second pin-receiving elements 54 via the corresponding second fitting holes 53, so that the mounting member 18 is pivotally supported around the second support pins 41 (the X axis, the second axis) with respect to the rocking ring 19.

The other parts are the same as those in the first embodiment. As is similar to the first embodiment, all of the knives 15 have no spacing along the die plate 1, even if a deviation partially generates in the spacing between the knives 15 and the die plate 1 during the operation of the pelletizer, thereby enabling a satisfactory cutting to be obtained. Hence, neither the resin-discharging surface 3 in the die plate 1 is injured nor the abrasion of the knives 15 is accelerated.

In addition, there is neither a spherical surface nor a cylindrical surface between the fixing member 17 and the rocking ring 19 as well as between the rocking ring 19 and the mounting member 18, thereby making it possible to easily machine the fixing member 17, the rocking ring 19 and the mounting member 18. Moreover, there is no such large sliding surface as a spherical surface, a cylindrical surface or the like, and therefore the mounting member 18 in the knife holder 13 can be pivotally moved around the Y axis as well as around the X axis with reduced resistance, when a space takes place between the knives 15 and the die plate 1.

Figure 8:
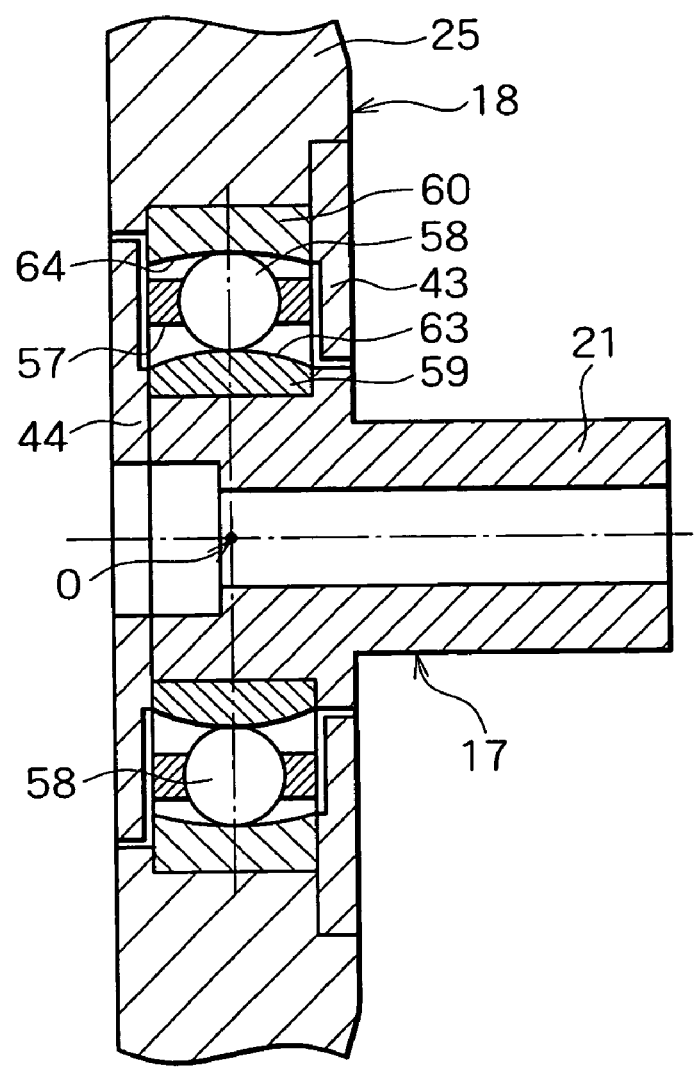
FIG. 8 shows a longitudinal section of a fourth embodiment according to the invention viewed in a longitudinal direction.
Figure 9:
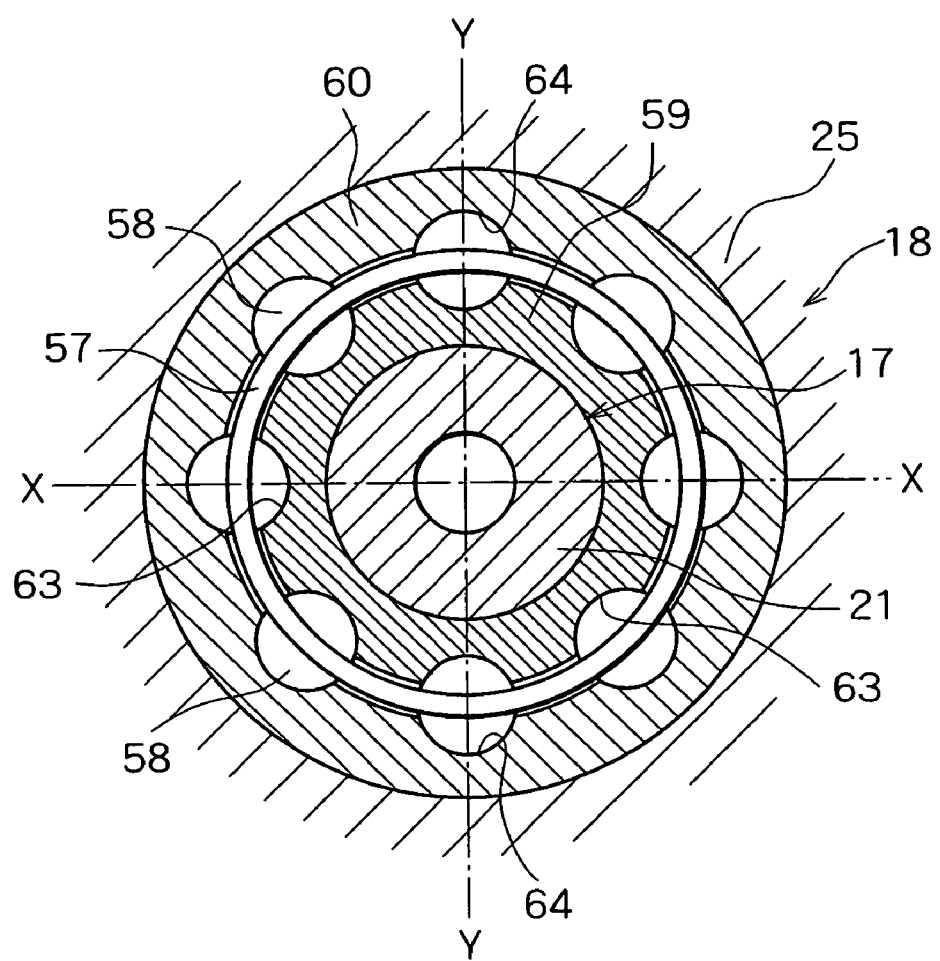
FIG. 9 is a cross section of the same viewed from the rear side.
Figure 10:
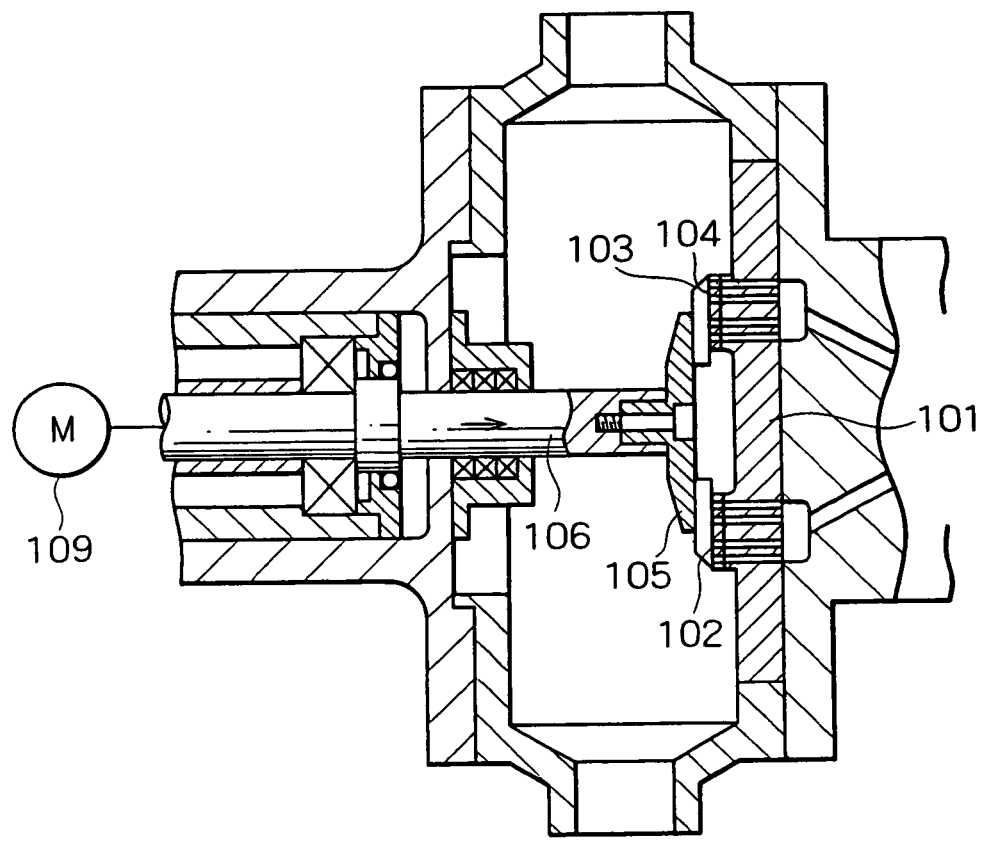
FIG. 10 is a longitudinal sectional view of a pelletizer in the prior art.

FIGS. 8 and 9 show another embodiment of a cutter machine, in which a fixing member 17 in a knife holder 13 is constituted by a fixing cylinder element 21 and a mounting member 18 in the knife holder 13 is constituted by a mounting element 25. Balls 58 as rolling elements are interposed between the fixing cylinder element 21 and the mounting element 25, and they are arranged in the same circumferential spacing with the aid of an annular holder 57. An annular inner ring 59 is disposed on the outer circumferential surface of the fixing cylinder element 21 and an annular outer ring 60 is disposed on the inner circumferential surface of the mounting element 25. In this case, the balls 58 are supported between the inner ring 59 and the outer ring 60.

On the outer circumferential surface of the inner ring 59, a holding groove 63 is formed such that it has an arch-shaped surface centered at the origin O in the axial direction, i.e., in the front/rear direction, as well as a substantially semicircular surface in the circumferential direction in accordance with the balls 58. On the inner circumferential surface of the outer ring 60, a holding groove 64 is formed such that it has an arch-shaped surface in the axial direction and a substantially semicircular surface in the circumferential direction in accordance with the balls 58. The holder 57 holds the balls at the center of the holding grooves 63 and 64 in the axial direction. With the aid of the rolling movement of the balls 58, the mounting member 18 can be supported pivotally around four axes, i.e., the Y axis, the X axis and two intermediate axis between the Y and X axes with respect to the fixing member 17.

The other parts are the same as those in the first embodiment. As is similar to the first embodiment, all of the knives 15 have no spacing along the die plate 1, even if a deviation partially generates in the spacing between the knives 15 and the die plate 1 during the operation of the pelletizer, thereby enabling a satisfactory cutting to be obtained. Hence, neither the resin-discharging surface 3 in the die plate 1 is injured nor the abrasion of the knives 15 is accelerated.

In the fourth embodiment, the rotation torque of the cutter shaft 6 is transferred from the fixing member 17 in the knife holder 13 to the mounting member 18 in the knife holder 13 via the balls 58. When a partial space takes place between the knives 15 and the die plate 1, the rolling of the balls 58 is used to rock the mounting member 18 relative to the fixing member 17, thereby making it possible to more smoothly rock the mounting member 18 relative to the fixing member 17. In other words, the rolling of the balls 58 allows the mounting member 18 in the knife holder 13 to be rocked with less resistance.

In the fourth embodiment shown in FIGS. 8 and 9, the balls are used as most preferable rolling elements. However, the other elements each having a shape other than a ball can also be used, so long as they provide no disturbance on the rocking motion and the transmission of the rotation torque.

In the first embodiment shown in FIGS. 1 to 3, or in the second embodiment shown in FIGS. 4 and 5, or in the third embodiment shown in FIGS. 6 and 7, the rocking ring 19 is pivotally supported around the Y axis with respect to the fixing member 17, and the mounting member 18 is pivotally supported around the X axis with respect to the rocking ring 19. However, the rocking direction is restricted neither to those around the Y axis nor to that around the X axis. For instance, the rocking ring 19 can be pivotally supported around a first axis other than the Y axis with respect to the fixing member 17, and the mounting member 18 can be pivotally supported around a second axis other than the X axis with respect to the rocking ring 19.

While the preferred embodiments have been shown and described, various modifications and substitutions may be made without departing from the spirit and scope of the invention. Accordingly, it is to be understood that the present invention has been described by way of example, and not by limitation.

We claim:

1. A cutter machine comprising:
   a cutter shaft;
   a knife holder mounted onto said cutter shaft at the center portion of said knife holder;
   a knife for cutting a material to be cut, said knife being mounted onto the outer circumference of said knife holder;
   a driving apparatus for rotating said cutter shaft, wherein the material is cut with said knife by rotating said knife holder with said cutter shaft, wherein said knife holder is separated into a fixing member, mounted onto an end of said cutter shaft adjacent said knife and a mounting member onto which said knife is mounted, and wherein said mounting member is pivotally supported around at least two axes with respect to said fixing member; and
   a rocking ring interposed between said fixing member and said mounting member, wherein said rocking ring extends around said fixing member such that said fixing member extends substantially completely through said rocking ring, wherein said rocking ring is pivotally mounted to said fixing member such that said rocking ring is capable of pivoting relative to said fixing member only about a fixed first axis, and said mounting member is pivotally mounted to said rocking ring such that said mounting member is capable of pivoting relative to said rocking ring only about a fixed second axis, wherein said mounting member is capable of pivoting with respect to said fixing member about only said first and second axes, and whereby said fixing member does not pivot with respect to said cutter shaft during pivoting of said mounting member via said rocking ring.

2. The cutter machine according to claim 1, wherein an outer surface of said fixing member includes a first fitting convex surface and an inner surface of said rocking ring includes a first fitting concave surface, the first fitting convex surface of said fixing member and the first fitting concave surface of said rocking ring being slidably engaged with each other in such a manner that said rocking ring can be rocked relative to said fixing member, and wherein an outer surface of said rocking ring includes a second fitting convex surface and an inner surface of said mounting member includes a second fitting concave surface, the second fitting convex surface of said rocking ring and the second fitting concave surface of the mounting member being slidably engaged with each other in such a manner that the mounting member can be rocked with respect to the rocking ring.

3. A cutter machine comprising:
   a cutter shaft;
   a knife holder mounted onto said cutter shaft at the center portion of said knife holder;
   a knife for cutting a material to be cut, said knife being mounted onto the outer circumference of said knife holder;
   a driving apparatus for rotating said cutter shaft, wherein the material is cut with said knife by rotating said knife holder with said cutter shaft, wherein said knife holder is separated into a fixing member, mounted onto an end of said cutter shaft adjacent said knife and a mounting member onto which said knife is mounted, and wherein said mounting member is pivotally supported around at least two axes with respect to said fixing member; and
   a rocking ring interposed between said fixing member and said mounting member, wherein said rocking ring extends around said fixing member such that said fixing member extends substantially completely through said rocking ring, wherein said rocking ring is pivotally supported around a first axis with respect to said fixing member, and said mounting member is pivotally supported around a second axis approximately perpendicular to said first axis with respect to said rocking ring, whereby said fixing member does not pivot with respect to said cutter shaft during pivoting of said mounting member via said rocking ring, further comprising a first support pin provided in the direction of said first axis and a second support pin provided in the direction of the second axis, wherein said rocking ring is pivotally supported around said first support pin with respect to said fixing member, and said mounting member is pivotally supported around said second support pin with respect to said rocking ring.

4. The cutter machine according to claim 3, wherein said first support pin is supported inside both said fixing member and said rocking ring and wherein said second support pin is supported inside both said rocking ring and said mounting member.

5. The cutter machine according to claim 3, wherein said first support pin is fixed to one of said fixing member and said rocking ring, and a first fitting opening for rotatably supporting said first support pin around the first axis is disposed on the other of said fixing member and said rocking ring, and wherein said second support pin is fixed to one of said rocking ring and said mounting member, and a second fitting opening for rotatably supporting said second support pin around the second axis is disposed on the other of said rocking ring and said mounting member.

* * * * *

UNITED STATES PATENT AND TRADEMARK OFFICE
CERTIFICATE OF CORRECTION

PATENT NO. : 7,338,273 B2 Page 1 of 1
APPLICATION NO. : 10/437063
DATED : March 4, 2008
INVENTOR(S) : Masashi Konno et al.

It is certified that error appears in the above-identified patent and that said Letters Patent is hereby corrected as shown below:

On the title page, item (73), the Assignee information is incorrect. Item (73) should read:

--(73) Assignee: Kabushiki Kaisha Kobe Seiko Sho (Kobe Steel, Ltd.), Kobe-shi (JP)--

Signed and Sealed this

Twenty-sixth Day of January, 2010

David J. Kappos
*Director of the United States Patent and Trademark Office*